United States Patent [19]

Miyabayashi et al.

[11] 4,306,214

[45] Dec. 15, 1981

[54] NON-LINEAR RESISTANCE ELEMENT, METHOD FOR PREPARING SAME AND NOISE SUPPRESSOR THEREWITH

[75] Inventors: Susumu Miyabayashi, Misato; Masatada Yodogawa, Narashino, both of Japan

[73] Assignee: TDK Electronics Co., Ltd., Tokyo, Japan

[21] Appl. No.: 64,807

[22] Filed: Aug. 8, 1979

[30] Foreign Application Priority Data

| | | | |
|---|---|---|---|
| Aug. 8, 1978 | [JP] | Japan | 53-96316 |
| Oct. 20, 1978 | [JP] | Japan | 53-129166 |
| Oct. 20, 1978 | [JP] | Japan | 53-129167 |
| Oct. 26, 1978 | [JP] | Japan | 53-131887 |
| Feb. 26, 1979 | [JP] | Japan | 54-21649 |

[51] Int. Cl.[3] .......... H01C 7/10; H01B 1/08; C04B 35/46

[52] U.S. Cl. .......... 338/21; 252/520; 501/134

[58] Field of Search .......... 252/520; 106/73.3; 338/20, 21

[56] References Cited

U.S. PATENT DOCUMENTS

| | | | |
|---|---|---|---|
| 3,033,907 | 5/1962 | Rue | 106/73.3 |
| 3,274,467 | 9/1966 | Graf | 106/73.3 |
| 3,715,701 | 2/1973 | Yperman | 252/520 |
| 3,816,348 | 6/1974 | Popowich | 252/520 |
| 3,903,226 | 9/1975 | Iga | 252/520 |
| 3,953,375 | 4/1976 | Nagano et al. | 252/520 |
| 4,094,061 | 6/1978 | Gupta et al. | 252/520 |
| 4,109,456 | 8/1978 | Yamada et al. | 106/73.3 |

*Primary Examiner*—O. R. Vertiz
*Assistant Examiner*—Mark Bell
*Attorney, Agent, or Firm*—Wyatt, Gerber, Shoup, Scobey & Badie

[57] ABSTRACT

A novel non-linear resistance element or a varistor element is proposed which is a sintered body composed of a ternary oxide mixture comprising titanium dioxide as the base component, bismuth oxide and a third oxide component selected from the group consisting of oxides of tantalum, niobium and antimony admixed in limited proportions. The sintered body is prepared by subjecting the powder mixture obtained by admixing a solution containing tantalum, niobium or antimony with titanium dioxide and bismuth oxide to sintering following drying and calcination. The varistor element of the invention is stable in its performance and has a sufficiently high non-linearity index so that excellent noise suppressors are prepared with the varistor element to be useful in absorbing the noise voltages generated in various rotatory machines such as miniature motors.

Further improvement in the above varistor element is proposed by adding a small amount of silicon dioxide to the ternary oxide mixtures.

4 Claims, 5 Drawing Figures

NON-LINEAR RESISTANCE ELEMENT, METHOD FOR PREPARING SAME AND NOISE SUPPRESSOR THEREWITH

BACKGROUND OF THE INVENTION

The present invention relates to a novel non-linear resistance element or, more particularly, to a novel resistance element with very stable performance which is a sintered body comprising, as the essential components, titanium dioxide, bismuth oxide and a third component.

The invention also provides an improved method for the preparation of the above described non-linear resistance elements and noise suppressors with the above non-linear resistance element.

The invention further provides a noise suppressor utilizing the non-linear resistance element above suitable to eliminate the noise voltage generated, for example, in miniature motors built in various precision electronic instruments.

The rapid development and growth in the fields of audio instruments, controlling instruments and small-sized rotary machines such as small or miniature motors in recent years have presented important problems in suppressing the noise voltage generation from the motors, protection of the instruments or motors from overvoltage and protection of contact points in relays. For solving such problems, so-called varistor elements or non-linear resistance elements, i.e. elements having markedly non-linear volt-ampere characteristic, are essential as a component of the circuit. The non-linear resistance elements must naturally satisfy diversified requirements in the performance thereof along with the requirement of low cost for the production thereof in consideration of the relatively low prices of the instruments or motors.

Various types of non-linear resistance elements have hitherto been proposed for satisfying the above requirements which sometimes conflict with each other. Several of the nonlinear resistance elements typically known in the art are made of silicon carbide-based sintered bodies, selenium or cuprous oxide varistors, zinc oxide-based sintered bodies and the like.

Needless to say, the most important characteristic parameter in varistor elements is the so-called non-linearity index $\alpha$ which is related to the voltage-current characteristic as expressed by the equation $$I=(V/C)^{\alpha},$$

where V is the voltage applied to the varistor element, I is the current across the varistor element, C is a constant corresponding to the voltage with a predetermined current and $\alpha$ is the nonlinearity index defined by the equation $$\alpha=\log_{10}(I_2/I_1)/\log_{10}(V_2/V_1),$$

in which $V_1$ and $V_2$ are the voltages with given current $I_1$ and $I_2$, respectively, This value of non-linearity index $\alpha$ is taken as a measure for evaluating the performance of non-linear resistance elements and, when $\alpha$ is equal to 1, i.e. $I_2/I_1=V_2/V_1$, the element is an ordinary ohmic resistor element and larger values of $\alpha$ are usually preferred for most of the varistor elements. Further, preferred values of the constant C depend on the use of the varistor element but relatively low C-values are recommended for varistors to be used at low voltages although it is a general requirement that any desired C-values can readily be obtained according to need.

Among the known varistor elements hitherto in use, those of silicon carbide-based sintered body are prepared by sintering silicon carbide particles of about 100 μm diameter with clay as a binder and the non-linearity in the voltage-current characteristic is determined by the voltage dependency of the resistance between grains or through the grain boundaries so that the C-value is adjustable by changing the thickness of the varistor element which is a function of the number of grain boundaries in the direction of the current. In the varistor elements for low voltage use, however, the number of grain boundaries must be so small owing to the relatively large C-value per grain boundary that the breakdown voltage is also disadvantageously decreased. In addition, silicon carbide-based varistor elements have a relatively small non-linearity index $\alpha$ of 3 to 7 and, moreover, difficulties are brought about due to the extreme hardness of the silicon carbide particles in the rapid wearing of the metal molds for shaping and in the unsatisfactory precision in the dimensions of shaped bodies.

On the other hand, varistor elements of selenium or cuprous oxide are unsatisfactory from the standpoint of practical use because their non-linearity indexes are only 2 to 3 and they cannot be used with large limiting voltages.

Further, the non-linearity index of zinc oxide-based varistor elements is large enough to be in the range of 10 to 50 along with fine particle size zinc oxide of about 10 μm or smaller and they can be advantageously used at a voltage varied in the range from 10 to 1000 volts. However, zinc oxide-based varistor elements are not free from deterioration of the nonlinearity characteristics with the lapse of time and they are also defective in the high cost of their production owing to the complicated manufacturing process and diversity of the necessary additive components.

Thus, there has been a strong demand in the electric industries for varistor elements, in which the non-linearity is obtained with the material per se little dependent on the boundary phenomena and any desired C-values can readily be obtained by chainging the thickness of the element in the direction of current without modifying the value of non-linearity index. Further there has been a demand for varistor elements having a larger non-linearity index $\alpha$ than silicon carbide-based varistors to be applicable to a wide variety of fields with low cost.

For example, a material for varistor elements is proposed in Japanese Patent Publication No. 53-11075 which is a sintered body composed of titanium dioxide admixed with 0.1 to 3% by moles of niobium oxide and 0.05 to 1.0% by moles of bismuth oxide. This material has a larger non-linearity index $\alpha$ than silicon carbidebased varistors and selenium or cuprous oxide varistors, and presents an advantage that a desired C-value can be obtained without changing the value of $\alpha$. One of the problems in this type of varistor elements is the uncontrollable variation in the performance of the products due to the difficulty in obtaining uniform distribution of the niobium oxide and bismuth oxide in the powder mixture to be subjected to sintering.

Further, varistor elements are proposed in Japanese Patent Publication No. 52-235 and U.S. Pat. No.

3,715,701 with a sintered body composed of titanium dioxide admixed with 0.005 to 0.1 mole of bismuth oxide and 0.001 to 0.05 mole of antimony oxide per mole of titanium dioxide. These varistor elements are also not free from the same problem of poor dispersion as in the titanium dioxide elements admixed with niobium oxide and bismuth oxide.

Turning now to the problem of noise suppression in rotatory machines, especially, in miniature motors, all of precision instruments of compact size utilizing miniature motors are subject to the disturbance by the noise generated in the motors with the sparking phenomenon between the commutator and the brush. To explain it, commutators in electric motors are shaped in a cylindrical form as composed of a plurality of commutator segments assembled with regular intervals of insulating layers. Therefore, the brush in contact with the rotating commutator moves from one segment to the next one jumping on the surface of the commutator over the insulating layer producing sparks by the spike voltage which is due to the large self-inductance inherent to a rotor constructed with a coil wound around a magnetic body. This phenomenon of sparking causes the electric noise generated in motors and, in addition, is undesirable due to the shortened life of the motor by the accelerated wearing of the commutator and the brush.

This spike voltage for sparking is a bipolar oscillating voltage with peak heights of as high as 20 to 50 times of the line voltage of the motor with a high frequency component of 2 to 5 MHz lasting for about 100 $\mu$seconds. In order to eliminate the noise voltage with such a high frequency component and to stabilize the operation of the instrument, a noise suppressor is indispensable having a non-linearity in the voltage-current characteristic as large as possible working at a voltage of 3 to 30 volts and capable of absorbing the high frequency component in the noise voltage whereby to decrease the noise voltage to a level of the line voltage of the motor. Hitherto known noise suppressors utilizes various principles and a variety of materials such as varistor elements but none of the prior art materials are unsatisfactory in several aspects.

SUMMARY OF THE INVENTION

Thus, an object of the present invention is to provide a novel non-linear resistance element which is very stable in its performance with a sufficiently large nonlinearity index $\alpha$. The element is a sintered body composed of, as the essential components, titanium dioxide, bismuth oxide and a third oxide component.

Another object of the present invention is to provide a novel method for the preparation of the above described nonlinear resistance element which is very conveniently practiced and easy in quality control of the products.

Further object of the present invention is to provide a noise suppressor which is very effective in eliminating noise voltages generated in various rotatory machines or, in particular, in miniature motors accompanying the sparking between the commutator and the brush by utilizing the excellent performance of the non-linear resistance element described above.

The sintered body for the non-linear resistance element of the invention comprises, as the essential components thereof, titanium dioxide, bismuth oxide and a third oxide component, in which the amount of the bismuth oxide is in the range from 0.05 to 10% by moles as $Bi_2O_3$ and the third oxide component is an oxide or a mixture of oxides of the elements selected from the group consisting of tantalum, niobium and antimony in an amount from 0.002 to 0.09% by moles as $Ta_2O_5$, $Nb_2O_5$ or $Sb_2O_3$ or as a total of them, the balance being titanium dioxide.

The sintered body for the non-linear resistance element according to the invention is prepared by blending given amounts of titanium dioxide and bismuth oxide with a solution or solutions containing the elements for the third oxide component, viz. tantalum, niobium or antimony, shaping the mixture into a desired form, drying the shaped body and sintering the thus dried shaped body at a temperature in the range from 1,100° to 1,400° C.

Although the above method utilizing the solution containing the element of the third oxide component is very effective in ensuring the complete uniformity of blending, the method is not always absolutely free from the problem of environmental pollution due to the use of an acid or other noxious liquids. Therefore, an alternative method has been developed in which the components are blended as dry with admixture of 0.02 to 3% by weight of silicon dioxide. By this improved method, the difficult problem of poor uniformity of the powder blend inherent to dry blending is largely solved so that the use of polluting liquids is no longer necessitated.

The noise suppressor of the present invention is prepared by providing electrodes to the above described non-linear resistance element and particularly suitable for eliminating the noise voltage generated in miniature motors.

DETAILED DESCRIPTION OF THE PREFERRED EMBODIMENTS

Figure 1:
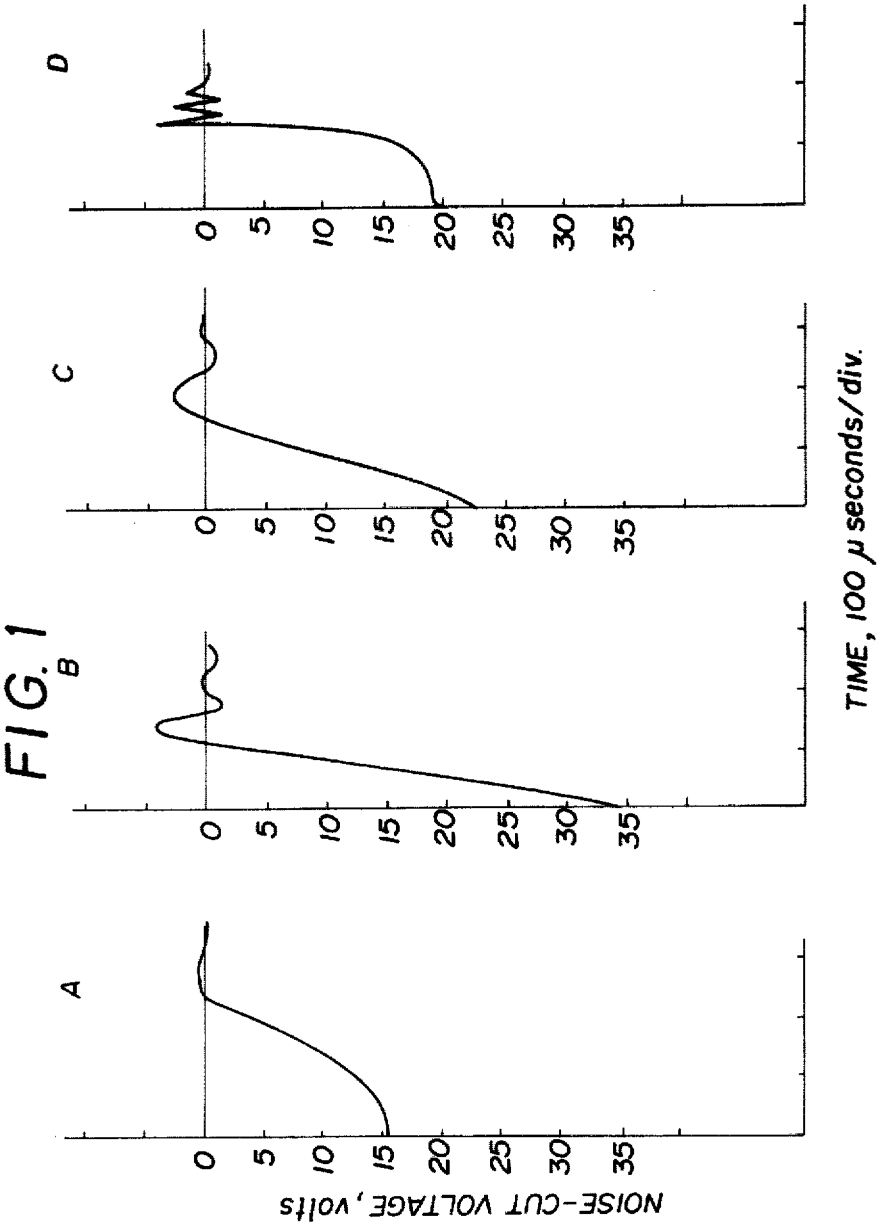
FIG. 1 is an oscilloscopic recording of the noise voltages in miniature motors with noise suppressors of an inventive varistor (A) and conventional varistors (B, C and D).

As is described above, the main component in the sintered body for the non-linear resistance element of the invention is titanium dioxide $TiO_2$ which is commercially available as a product with sufficiently high purity and any commercial products may be used as such without further purification. Both variations in the crystalline forms of anatase and rutile are used.

The second component of the sintered body is bismuth oxide $Bi_2O_3$ and it is optional that the titanium dioxide and the bismuth oxide are replaced with certain compounds decomposable by firing to corresponding oxides. The particle size distribution is not particularly limitative but it is usual to use oxides with an average particle diameter in the range from 5 to 300 μm or finer. The amount of the bismuth oxide in the sintered body is within a range from 0.05% by moles to 10% by moles calculated as $Bi_2O_3$ because this range is critical in obtaining desired non-linearity.

The third oxide component is one or a combination of the oxides of tantalum, niobium and antimony and these components are incorporated into the powder mixture of titanium dioxide and bismuth oxide not as powders but as solutions containing the elements of tantalum, niobium or antimony in the form of soluble compounds. Any kinds of compounds of these elements can be used insofar as they are sufficiently soluble in water, acids or other solvents and readily decomposed by heating leaving respective oxides as the decomposition products. These soluble compounds are exemplified by tantalum fluoride $TaF_5$, tantalum oxychloride $TaOCl_3$ and tantalum chloride $TaCl_5$ for the tantalum oxide component, niobium oxychloride $Nb(OH)_2Cl_3$ and niobium chlorides $NbCl_5$ and $Nb_6Cl_{14}.7H_2O$ for the niobium oxide component and antimony chloride $SbCl_3$, antimony sulfate $Sb_2(SO_4)_3$ and antimony hydroxide $Sb(OH)_3$ for the antimony oxide component.

The antimony solution can be prepared by dissolving a commercially available antimony compound named above as such in water or other solvent in a concentration of 0.001 to 2% by weight. The antimony solution also may be prepared by dissolving antimony oxide in hydrochloric acid followed by dilution with an aqueous solution of tartaric acid. It is a convenient and recommendable way that the solution of tantalum or niobium is prepared by dissolving tantalum metal or niobium metal in a suitable acid such as hydrofluoric acid.

The content of this third oxide component in the sintered body is preferably in the range from 0.002 to 0.09% by moles or more preferably from 0.002 to 0.074% by moles. This is because any smaller amounts of the third oxide component result in smaller values of $\alpha$ and undesirably large C-values whereas larger amounts of the third oxide component in excess of the above range are also undesirable with smaller values of $\alpha$.

In addition to the above described essential components, viz. titanium dioxide, bismuth oxide and the third oxide component, it is optional that small amounts of certain metal oxides such as oxides of aluminum, lead and alkaline earth metals, e.g. magnesium, calcium, strontium and barium, are contained in the sintered body insofar as no adverse effects are produced on the characteristics of the $\alpha$-value and C-value.

It is of course optional that this third oxide component is a binary or ternary mixture of tantalum oxide, niobium oxide and antimony oxide. In this case, the total amount of these oxide components in the sintered body should be in the range from 0.002 to 0.09% by moles or, more preferably, from 0.002 to 0.074% by moles.

In the preparation of the sintered bodies with the above described essential components, powders of titanium dioxide and bismuth oxide in calculated amounts are admixed with the solution or solutions of the third oxide components, viz. solutions containing tantalum, niobium or antimony as dissolved in such volumes that desired contents of the third oxide components are obtained after sintering of the mixture and blended uniformly in a suitable blending machine such as a ball mill to form a slurried mixture, which is dried and subjected to sintering. A recommendable way is to calcine the dried powder mixture at a temperature of 800° to 1000° C. for 1 to 4 hours before sintering followed by pulverization into a powder which is then shaped into desired forms and subjected to sintering at a temperature of 1100° to 1400° C. for 1 to 4 hours. This calcination step is not always essential but desirable in order to improve the breakdown voltage of the sintered body.

The fabrication of the calcined powder into desired shaped form is carried out by adding a binder solution such as aqueous solutions of polyvinyl alcohol or carboxymethyl cellulose into the powder and the thus wetted powder is first shaped into small pellets to be shaped into desired forms by press-molding.

In the above described procedure, it is an essential requirement that the third components are admixed with titanium dioxide and bismuth oxide as solutions containing the elements in order to ensure the uniformity of blending. One of the problems in this procedure is that the solutions of tantalum, niobium and antimony should at any rate be acidic because compounds of these elements are rather unstable in neutral solutions. The use of such acid solutions is of course very undesirable for several reasons such as the corrosion of the processing equipments and environmental pollution which can be prevented only with great expense leading to an increased cost for production. Therefore, there has been an eager demand to develop a process in which no liquids or, at least, no noxious acids are indispensable.

When the third components are added as oxides such as tantalum oxide, niobium oxide and antimony oxide, the resultant sintered bodies have poor mechanical properties leading to eventual cracking in the assembling works or soldering with little reliability in practical use due to the unsatisfactory uniformity in the grain size distribution so that the non-linear resistance elements thus prepared have low reliability with respect to the life under load at high temperatures and characteristics against pulse voltages when used as a varistor for noise suppressor in motors consequently resulting in shortened life of the motors.

The inventors of the present invention have undertaken investigations for the above problem and unexpectedly discovered that addition of small amounts of silicon dioxide to the ternary powder mixture of oxides of titanium, bismuth and the third component is very effective in improving the reliability of the sintered body as a non-linear resistance element.

In this improved embodiment of the process, the powder mixture of titanium dioxide, bismuth oxide and one or more of the third oxide components is admixed with 0.02 to 3% by weight of silicon dioxide. The silicon dioxide to be added to the powder mixture has preferably a particle diameter of 10 μm or smaller though not particularly limited and preparation of the powder mixture and admixing of silicon dioxide may be carried out in a conventional blending machine such as a ball mill, optionally, with wetting by water or other solvents according to need to accelerate uniform mixing of the powdery components.

The contents of bismuth oxide and the third oxide components in the ternary powder mixture are from 0.05 to 10% by moles of bismuth oxide and from 0.002 to 0.09% by moles of the third oxide components, the balance being titanium dioxide, as in the process wherein the third components are added as solutions. In this particular procedure of the use of the oxide powders of the third components, however, it is recommendable to reduce the amount of the third oxide components not to exceed 0.074% by moles. When the amount of the silicon dioxide is smaller than 0.02% by weight, uniformity in grain size cannot be fully ensured while larger amounts of silicon dioxide than 3% by weight cause sticking of the body under sintering and undesirable variation in the varistor voltage of the non-linear resistance elements.

The non-linearity in the voltage-current characteristic of the thus prepared non-linear resistance element of the invention is determined solely by the body properties of the sintered material per se and not by the phenomena in the grain boundaries so that any desired C-values can be obtained readily by selecting the thickness of the sintered body in the direction of the current without affecting the value of $\alpha$. Moreover, the C-value per unit thickness is so small that a non-linear resistance element for low voltage use can be readily obtained. Further, the elements of the invention have high reliability in respect of breakdown voltage and other properties with considerably larger values of $\alpha$ than in the varistors made of silicon carbide so that they are very versatile for use in a wide variety of application fields in electric or electronic instruments even if not to mention the economical advantages owing to the less diversified components.

When a non-linear resistance element of the invention is used as a varistor for noise suppressor in miniature motors, one of the particularly advantageous properties of the inventive element is the low working voltage of about 10 volts or lower with sufficiently large values of $\alpha$ with which the high frequency component of the noise voltage is efficiently absorbed and the noise voltage can be reduced to a level of the line voltage of the motor. Therefore an excellent noise suppressor is obtained by providing electrodes on to the opposite surfaces of the nonlinear resistance element of the invention. The electrodes may be either ohmic or non-ohmic insofar as no adverse effects are brought about to the performance of the non-linear resistance element per se and the electrodes may be provided by any known methods including baking, plating, vacuum deposition, sputtering, flame spraying and the like with no particular limitations.

Following are the examples to illustrate the inventive non-linear resistance elements and the process for the preparation thereof as well as the performance of the noise suppressor with the inventive non-linear resistance element in further detail.

EXAMPLE 1: (Experiments No. 1 to No. 11)

Tantalum metal in an amount of 10 g was dissolved in hydrofluoric acid with admixture of several drops of nitric acid and the acid solution was evaporated to dryness to give a salt residue which was dissolved again in 100 ml of hydrofluoric acid with dilution with water to a total volume of 1000 ml giving a concentration of tantalum of 1.0% by weight. To this solution was added 100 ml of sulfuric acid followed by evaporation to fuming and dilution with water to a volume of 1000 ml to give a final solution containing 1.0% by weight of tantalum in 10% sulfuric acid.

Powders of titanium dioxide and bismuth oxide each having a particle size of 10 $\mu$m or smaller were blended in a proportion as indicated in Table 1 below and the tantalum solution above prepared was added to the powder mixture in a volume such that the content of tantalum oxide in the sintered body corresponded to the molar proportion also indicated in Table 1.

The powder mixture thus wetted with the tantalum solution was milled well in a ball mill, if necessary, with addition of a small volume of water to give a homogeneous slurried mixture which was dried and subjected to calcination at 1000° C. for 2 hours in air in an electric furnace.

This calcined mixture was pulverized to a particle size to pass a screen of 48 mesh opening and the powder was admixed with 5% aqueous solution of polyvinyl alcohol as a binder in such a volume that the amount of the polyvinyl alcohol was 2% by weight of the powder. The mixture was then shaped into pellets of each 1 mm diameter and 1 mm length and the pellets were shaped by press molding into a disc of 15 mm diameter and 1 mm thickness, which was subjected to sintering at about 1300° C. for 2 hours in air.

TABLE 1

| Exp. No. | Composition, % by moles | | | Electric properties | |
|---|---|---|---|---|---|
| | as $Ta_2O_5$ | as $Bi_2O_3$ | as $TiO_2$ | $\alpha$ | C, V/mm |
| 1 | 0.002 | 0.5 | 99.498 | 5 | 64 |
| 2 | 0.01 | 0.5 | 99.49 | 8 | 40 |
| 3 | 0.05 | 0.5 | 99.45 | 10 | 12 |
| 4 | 0.09 | 0.5 | 99.41 | 6 | 9 |
| 5 | 0.02 | 0.05 | 99.93 | 6 | 11 |
| 6 | 0.02 | 0.5 | 99.48 | 10 | 12 |
| 7 | 0.02 | 5.0 | 94.98 | 8 | 20 |
| 8 | 0.02 | 10.0 | 89.98 | 5 | 70 |
| 9* | 0.001 | 0.5 | 99.499 | 2 | 85 |
| 10* | 0.10 | 0.5 | 99.4 | 2 | 8 |
| 11* | 0.02 | 0.04 | 99.9 | 3 | 7 |
| 12* | 0.02 | 11.0 | 88.98 | 4 | 85 |

*Comparative experiment

The sintered body thus obtained was provided with silver electrodes on both of the opposite surfaces by baking and the voltage-current characteristics of the sintered body were determined by use of these electrodes to give the results shown in Table 1. The C-value in the table was the value of the voltage in volts/mm as determined with current density of 2 mA/cm$^2$ across the sintered body between the electrodes.

As is clear from the results set out in the table, the formulation with the contents of tantalum oxide and bismuth oxide in the ranges of from 0.002 to 0.09% by moles and from 0.05 to 10% by moles as $Ta_2O_5$ and $Bi_2O_3$, respectively, gives a value of $\alpha$ equal to or larger than 5 with the largest value of as large as 10 while the values of $\alpha$ obtained with the formulations outside the above ranges of the $Ta_2O_5$ and $Bi_2O_3$ contents were always smaller than 5. Furthermore, the C-values per unit thickness of the disc samples were diversified in a wide range from 9 to 70 volts/mm indicating the versatility of the sintered bodies according to the invention as varistors for low voltage use.

EXAMPLE 2: (Experiments No. 13 to No. 30)

A niobium solution containing 1.0% by weight of niobium in 10% sulfuric acid was prepared in just the same manner as in the preparation of the tantalum solution in Example 1 except for the use of 10 g of niobium metal instead of tantalum metal.

Powder mixtures of titanium dioxide and bismuth oxide in a proportion as indicated in Table 2 below were slurried each by admixing the above prepared niobium solution in a volume such that the content of niobium oxide in the final sintered body corresponded to the molar proportion given in Table 2 and the slurried mixtures were dried and calcined at about 1000° C. for 30 minutes in air in an electric furnace.

TABLE 2

| | Composition, % by moles | | | Electric properties | | |
|---|---|---|---|---|---|---|
| Exp. No. | as $Nb_2O_5$ | as $Bi_2O_3$ | as $TiO_2$ | α | C, V/mm | Noise-cut voltage, V |
| 13 | 0.002 | 0.5 | 99.498 | 5 | 12 | 28.8 |
| 14 | 0.01 | 0.5 | 99.49 | 7 | 10 | 24.0 |
| 15 | 0.05 | 0.5 | 99.45 | 6 | 6 | 14.4 |
| 16 | 0.09 | 0.5 | 99.41 | 5 | 5 | 12.0 |
| 17 | 0.02 | 0.05 | 99.93 | 5 | 6 | 14.4 |
| 18 | 0.05 | 0.05 | 99.9 | 5 | 3 | 7.2 |
| 19 | 0.09 | 0.05 | 99.86 | 5 | 3 | 7.2 |
| 20 | 0.02 | 1.0 | 98.98 | 6 | 8 | 19.2 |
| 21 | 0.02 | 5.0 | 94.98 | 6 | 8 | 19.2 |
| 22 | 0.02 | 10.0 | 89.98 | 6 | 9 | 21.6 |
| 23 | 0.09 | 10.0 | 89.91 | 5 | 6 | 15.0 |
| 24* | 0.001 | 0.5 | 99.499 | 2.5 | 80 | — |
| 25* | 0.10 | 0.5 | 99.4 | 1.5 | 4 | 46.2 |
| 26* | 0.02 | 0.04 | 99.94 | 1.3 | 6 | 55.0 |
| 27* | 0.02 | 11.0 | 88.98 | 2 | 9 | 61.0 |
| 28* | 0.001 | 0.05 | 99.949 | 2 | 32 | — |
| 29* | 0.10 | 10.0 | 89.9 | 1.5 | 8 | 60.0 |
| 30* | 0.001 | 10.0 | 89.999 | 3 | 150 | — |

*Comparative experiment

The thus calcined mixture was pulverized to pass a screen of 48 mesh opening and the powder was shaped, in the same manner as in Example 1 including the admixture of polyvinyl alcohol as the binder, into a disc of 16 mm diameter and 1.2 mm thickness which was subjected to sintering at 1300° C. for 1 hour to give a sintered body for non-linear resistance element.

The voltage-current characteristics of these sintered disc samples were determined in just the same manner as in Example 1 to give the results as set out in Table 2, in which the C-values were determined with a current density of 10 $mA/cm^2$ across the sintered disc sample.

As is evident from the results shown in the table, niobium oxide is even more effective than tantalum oxide as shown in Example 1 in respect of increasing the value of α.

In the next place, each of the above prepared sintered discs with silver electrodes on both of the opposite surfaces was connected to a miniature motor between the terminals of the coil and the noise-cut voltage was determined by use of an oscilloscope to give the value shown in Table 2.

EXAMPLE 3

A non-linear resistance element was prepared in the same manner as in Example 2 with a formulation composed of 0.05% by moles of niobium oxide, 0.5% by moles of bismuth oxide and 99.45% by moles of titanium dioxide and the same noise-cut test as in Example 2 was undertaken with this element connected to a miniature motor of rating voltage 5 volts. The result obtained with an oscilloscope is reproduced in FIG. 1(A). FIG. 1(B) to FIG. 1(D) show the results obtained in the similar tests with conventional non-linear resistance elements made of $Fe_2O_3$, $SnO_2$ and ZnO, respectively. As is clear from these results, the non-linear resistance element of the present invention exhibits very superior performance to those of the conventional ones.

EXAMPLE 4: (Experiments No. 31 to No. 48)

Slurried powder mixtures were prepared each in a ball mill with titanium dioxide and bismuth oxide, each having a particle diameter of 10 μm or smaller, admixed with an aqueous solution of antimony chloride of 0.1 molar concentration in such proportions that the molar ratio of the components as oxides indicated in Table 3 below was obtained in the sintered body prepared therewith.

Calcination of these powder mixtures, pulverization, shaping into discs of 16 mm diameter and 1.2 mm thickness and sintering were carried out just in the same manner as in Example 2 to give sintered bodies for non-linear resistance elements.

Determination of the values of α, C-values and noise-cut voltages with these elements was conducted also in the same manner as in Example 2 to give the results shown in Table 3.

The oscilloscopic recording obtained with a non-linear resistance element with a composition of 0.05% by moles of antimony oxide, 0.5% by moles of bismuth oxide and 99.45% by moles of titanium dioxide was as good as that shown in FIG. 1(A).

EXAMPLE 5: (Experiments No. 49 to No. 56)

An antimony-containing aqueous solution of 0.1 molar concentration was prepared by dissolving 29 g of antimony oxide $Sb_2O_3$ in 100 ml of concentrated hydrochloric acid followed by evaporation to dryness to give chloride residue which was dissolved again in 100 ml of a 20% aqueous solution of tartaric acid with dilution to 1000 ml by adding water.

TABLE 3

| | Composition, % by moles | | | Electric properties | | |
|---|---|---|---|---|---|---|
| Exp. No. | as $Sb_2O_3$ | as $Bi_2O_3$ | as $TiO_2$ | α | C, V/mm | Noise-cut voltage, V |
| 31 | 0.002 | 0.5 | 99.498 | 5 | 13 | 31 |
| 32 | 0.01 | 0.5 | 99.49 | 8 | 9 | 21.6 |
| 33 | 0.05 | 0.5 | 99.45 | 6 | 6 | 12.6 |
| 34 | 0.09 | 0.5 | 99.41 | 5 | 5 | 12.0 |
| 35 | 0.02 | 0.05 | 99.93 | 5 | 6 | 14.4 |
| 36 | 0.05 | 0.05 | 99.9 | 5 | 4 | 9.6 |
| 37 | 0.09 | 0.05 | 99.86 | 5 | 3 | 7.2 |
| 38 | 0.02 | 1.0 | 98.98 | 6 | 8 | 24.0 |
| 39 | 0.02 | 5.0 | 94.98 | 6 | 8 | 19.0 |
| 40 | 0.02 | 10.0 | 89.98 | 6 | 8 | 19.0 |
| 41 | 0.09 | 10.0 | 89.91 | 5 | 6 | 15.0 |
| 42* | 0.001 | 0.5 | 99.499 | 2 | 160 | — |
| 43* | 0.10 | 0.5 | 99.4 | 1.3 | 3 | 15.0 |
| 44* | 0.02 | 0.04 | 99.94 | 1.5 | 6 | 24.0 |
| 45* | 0.02 | 11.0 | 88.98 | 2 | 9 | 30.0 |
| 46* | 0.001 | 0.05 | 99.949 | 1.5 | 80 | — |
| 47* | 0.10 | 10.0 | 89.9 | 1.5 | 8 | 30.0 |
| 48* | 0.001 | 10.0 | 89.999 | 4 | 200 | — |

Slurried powder mixtures were prepared each in a ball mill with titanium dioxide and bismuth oxide, each having a particle diameter of 10 μm or smaller, admixed with two or three of the tantalum solution prepared in Example 1, the niobium solution prepared in Example 2 and the antimony solution prepared as above in such proportions that the molar ratios of the components as oxides indicated in Table 4 below were obtained in the sintered body prepared therewith.

Calcination of these powder mixtures, pulverization, shaping into discs of 16 mm diameter and 1.2 mm thickness and sintering were carried out in just the same manner as in Example 2 to give sintered bodies for non-linear resistance elements.

Determination of the values of α, C-values and noise-cut voltages with these elements was conducted also in the same manner as in Example 2 to give the results shown in Table 4.

The oscilloscopic recording obtained with a non-linear resistance element with a composition of 0.01% by moles of niobium oxide, 0.005% by moles of tantalum oxide, 0.005% by moles of antimony oxide, 0.5% by moles of bismuth oxide and 99.48% by moles of titanium dioxide was as good as that shown in FIG. 1(A).

EXAMPLE 6

Figure 4:
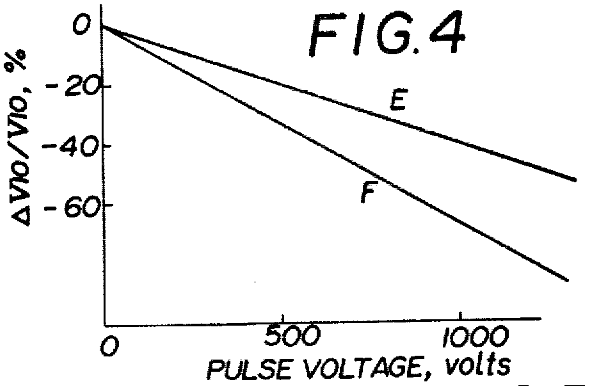
FIG. 4 shows the decrease in the $V_{10}$ value obtained with the varistor elements with (Curve E) or without (Curve F) addition of silicon dioxide by 10 times of pulse voltage application as a function of the pulse peak voltage.
Figure 5:
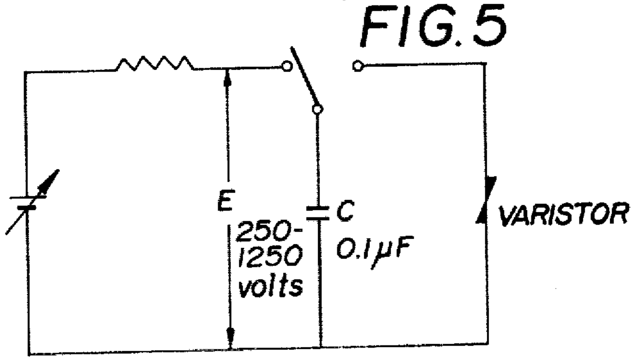
FIG. 5 is the circuit diagram used for the application of pulse voltage in the test shown in FIG. 4.

Powder mixtures were prepared each by blending as wet in a ball mill 0.06% by moles of antimony oxide $Sb_2O_3$, 0.5% by moles of bismuth oxide $Bi_2O_3$ and 99.44% by moles of titanium dioxide $TiO_2$, each having a particle diameter of 10 μm or smaller, with admixture of 0.01 to 3% by weight of silicon dioxide $SiO_2$. These powder mixtures were dried, calcined, pulverized, shaped into discs of 16 mm diameter and 1.2 mm thickness and sintered in just the same manner as in Example 2 to give sintered bodies for non-linear resistance elements.

circuit shown in FIG. 5 in which the varistor element under test was connected by switching to a capacitor of 0.1 μF charged to a varied voltage of 250 to 1250 volts. The application of pulse voltage in this manner was repeated 10 times for each of the varistor elements to give the results in the decrease of the $V_{10}$ value as shown in FIG. 4 in which Curves E and F were for the varistor elements as in the continuous loading tests shown in FIG. 3 prepared with or without addition of silicon dioxide, respectively. The results of this figure also indicate the remarkable stabilizing effect obtained by the addition of silicon dioxide in the formulation.

When the antimony oxide used in the above experiments was replaced with tantalum oxide, niobium oxide, or a combination of two or three of these oxides, the results were as good as with antimony oxide.

TABLE 4

| | Composition, % by moles | | | | | Electric properties | | |
|---|---|---|---|---|---|---|---|---|
| Exp. No. | as $Nb_2O_5$ | as $Ta_2O_5$ | as $Sb_2O_3$ | as $Bi_2O_3$ | as $TiO_2$ | α | C, V/mm | Noise-cut voltage, V |
| 49 | 0.001 | — | 0.001 | 0.5 | 99.495 | 6 | 13 | 30 |
| 50 | 0.005 | — | 0.005 | 0.5 | 99.49 | 9 | 10 | 20 |
| 51 | 0.025 | 0.025 | — | 0.5 | 99.45 | 8 | 7 | 16.0 |
| 52 | 0.04 | 0.05 | — | 0.5 | 99.41 | 7 | 4 | 9.0 |
| 53 | 0.010 | 0.005 | 0.005 | 0.05 | 99.93 | 6 | 3 | 7.2 |
| 54 | 0.010 | 0.005 | 0.005 | 0.5 | 99.48 | 6 | 5 | 12.0 |
| 55 | 0.010 | 0.005 | 0.005 | 5 | 94.98 | 7 | 9 | 20.0 |
| 56 | 0.010 | 0.005 | 0.005 | 10 | 89.98 | 7 | 12 | 27.0 |

Figure 2:
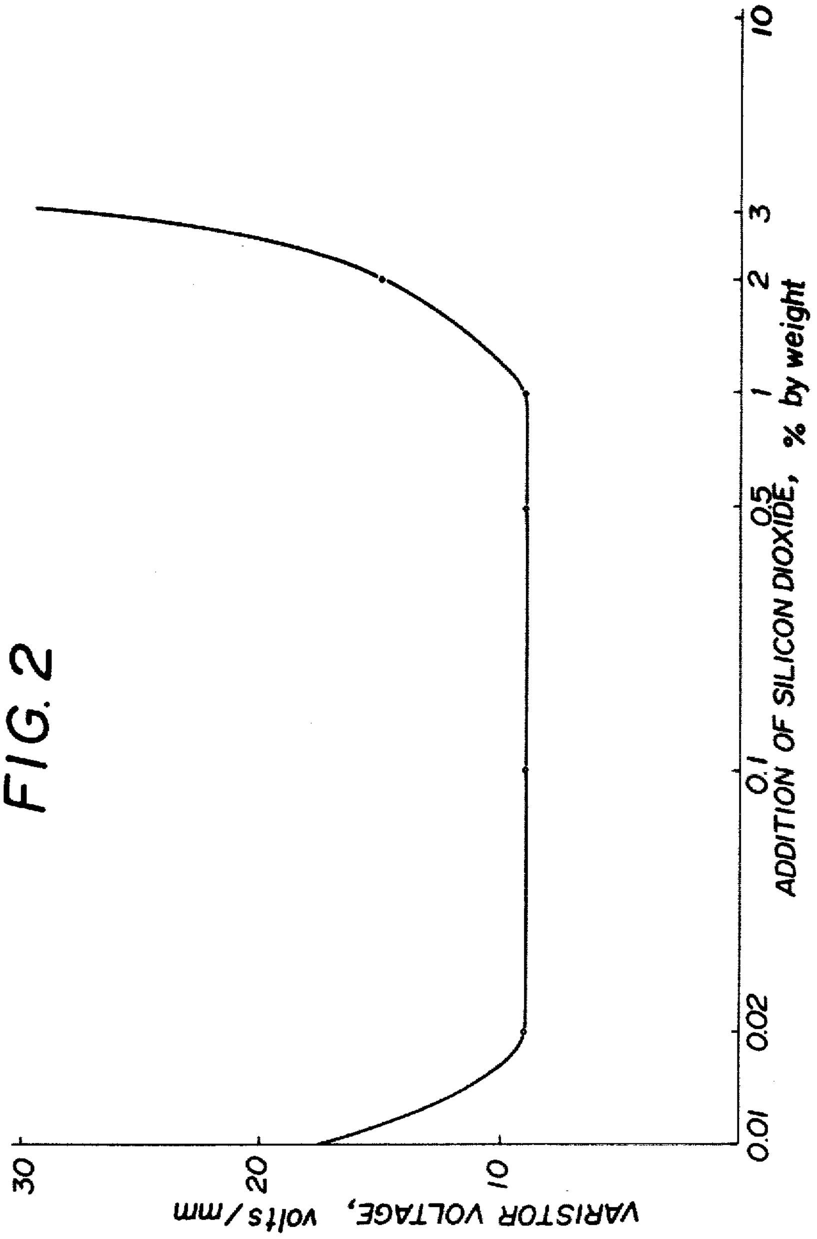
FIG. 2 shows the varistor voltage of the inventive nonlinear resistance elements as a function of the amount of silicon dioxide in the oxide mixture.

Each of these non-linear resistance elements was provided with silver electrodes on both of the opposite surfaces by baking and the varistor voltaged was determined to give the results shown in FIG. 2 giving the varistor voltage as a function of the amount of the silicon dioxide in the powder mixtures. As is understood from this figure, the varistor voltage was substantially constant with the content of silicon dioxide in the range from 0.02 to 3% by weight showing a very promising characteristic as a varistor for noise suppressor in miniature motors while the varistor voltage rapidly increased with the increase in the content of silicon dioxide above 3% by weight.

Microscopic examination of the sintered bodies without the addition of silicon dioxide or with the addition of 0.1% by weight of silicon dioxide revealed that the addition of silicon dioxide was effective in reducing the grain size of titanium dioxide in the sintered body as well as in increasing the uniformity of the grain size distribution.

Stability tests for the values of α and C in the above prepared non-linear resistance elements with addition of 0.5% by weight of silicon dioxide and without addition of silicon dioxide by continuous loading at an elevated temperature where a DC voltage of 10 volts was applied between the electrodes continuously for a period up to 1200 hours in a thermostat at 80° C.

Figure 3:
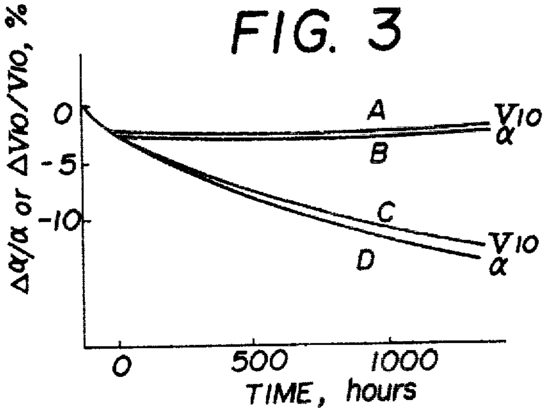
FIG. 3 shows the changes in the value of $\alpha$ and $V_{10}$ values obtained in the continuous loading tests at 80° C. with varistor elements with addition of silicon dioxide (Curves A and B) and without addition of silicon dioxide (Curves C and D).

The results of the above stability tests are shown in FIG. 3 by the Curves A and B for the element with silicon dioxide and Curves C and D without silicon dioxide in which Curves A and C are for the changes of the $V_{10}$ value which is the voltage between the electrodes with a current of 10 mA/cm$^2$ across the element and Curves B and D are for the changes of the values of α. As is evident from the results shown in this figure, a very remarkable stabilizing effect is obtained by the addition of silicon dioxide in the formulation.

In addition to the above described continuous loading tests, stability in the $V_{10}$ value was examined also by repeated application of a pulse voltage by use of the An oscilloscopic recording of the noise-cut voltage was undertaken in the same manner as in Example 2 with a varistor element prepared with a formulation of 0.05% by moles of antimony oxide, 0.5% by moles of bismuth oxide and 99.45% by moles of titanium dioxide admixed with 0.5% by moles of silicon dioxide to give a result almost identical with the result shown in FIG. 1 (A).

What is claimed is:

1. A non-linear resistance element which is a sintered body of an oxide mixture comprising, as the essential components thereof, titanium dioxide, bismuth oxide and a third oxide component, in which the third oxide component is at least one selected from the group consisting of tantalum oxide, niobium oxide and antimony oxide and the amounts of the bismuth oxide and the third oxide component are from 0.05 to 10% by moles as $Bi_2O_3$ and from 0.002 to 0.09% by moles as $Ta_2O_5$, $Nb_2O_5$ or $Sb_2O_3$, respectively, the balance being titanium dioxide, and admixed with 0.02 to 3% by weight of silicon dioxide based on the total amount of titanium dioxide, bismuth oxide and the third oxide component.

2. A method for the preparation of a non-linear resistance element which is a sintered body of an oxide mixture comprising, as the essential components thereof, titanium dioxide, bismuth oxide and a third oxide component which is at least one oxide selected from the group consisting of tantalum oxide, niobium oxide and antimony oxide, the amounts of the bismuth oxide and the third oxide component being from 0.05 to 10% by moles as $Bi_2O_3$ and from 0.002 to 0.09% by moles as $Ta_2O_5$, $Nb_2O_5$ or $Sb_2O_3$, respectively, the balance being titanium dioxide additionally containing from 0.02 to 3% by weight of silicon dioxide based on the total amount of titanium dioxide, bismuth oxide and the third oxide component which comprises the steps of:

(a) admixing selected amounts of powders of titanium dioxide bismuth oxide and silicon dioxide with at least one solution containing a selected amount of a soluble compound of tantalum, niobium or antimony dissolved therein, (b) drying the powder mixture obtained in the step (a) above, and (c) subjecting the thus dried powder mixture obtained in the step (b) to sintering at a temperature of from 1100° to 1400° C. for from 1 to 4 hours.

3. A method as in claim 2 including the additional step of calcining the powder mixture obtained in step (a) at a temperature of from 800° to 1000° C. for from 1 to 4 hours prior to sintering.

4. A noise suppressor comprising the non-linear resistance element as claimed in claim 2 and a pair of electrodes provided on the opposite surfaces of said non-linear resistance element.

* * * * *